(12) United States Patent
Lysejko et al.

(10) Patent No.: US 6,298,246 B1
(45) Date of Patent: Oct. 2, 2001

(54) SUBSCRIBER TERMINAL AND METHOD FOR PASSING CONTROL SIGNALS BETWEEN A FIRST AND SECOND SIGNAL PROCESSING UNITS

(75) Inventors: Martin Lysejko, Bagshot; Ian L. Cooper, Basingstoke; Tarlochan S. Gohlar, Hounslow, all of (GB)

(73) Assignee: Airspan Networks, Inc., Seattle, WA (US)

( * ) Notice: Subject to any disclaimer, the term of this patent is extended or adjusted under 35 U.S.C. 154(b) by 0 days.

(21) Appl. No.: 09/192,994

(22) Filed: Nov. 16, 1998

(30) Foreign Application Priority Data

Nov. 20, 1997 (GB) .................................................. 9724612

(51) Int. Cl.⁷ .............................. H04B 1/38; H04M 1/00
(52) U.S. Cl. .......................................................... 455/557
(58) Field of Search ........................... 455/226.2, 226.4, 455/63, 67.1, 67.3, 425, 131, 161.2, 161.3, 3.2, 3.3, 226.3

(56) References Cited

U.S. PATENT DOCUMENTS

| | | | | |
|---|---|---|---|---|
| 3,684,823 | * | 8/1972 | McVoy | 178/5.1 |
| 4,439,784 | * | 3/1984 | Furukawa et al. | |
| 4,567,595 | * | 1/1986 | Hedlund | 371/49 |
| 4,592,093 | * | 5/1986 | Ouchi | 455/4 |
| 4,608,710 | * | 8/1986 | Sugiura | 455/4 |
| 4,907,291 | | 3/1990 | Yamamoto | 455/78 |
| 5,386,587 | * | 1/1995 | Yuzawa | 455/3.2 |
| 5,442,811 | | 8/1995 | Kobayashi et al. | 455/67.3 |
| 5,457,734 | * | 10/1995 | Eryaman | 379/58 |
| 5,630,210 | * | 5/1997 | Marry | 455/67.3 |
| 5,815,682 | * | 9/1998 | Williams | 395/500 |
| 5,918,213 | * | 6/1999 | Bernard | 705/26 |
| 6,035,020 | * | 3/2000 | Weinstein | 379/93.09 |
| 6,072,429 | * | 6/2000 | Crothall | 342/357.1 |
| 6,101,176 | * | 8/2000 | Honkasalo | 370/335 |
| 6,112,232 | * | 8/2000 | Shahar | 709/217 |

FOREIGN PATENT DOCUMENTS

| | | | | |
|---|---|---|---|---|
| 0506443 | 9/1992 | (EP) | | H04B/1/04 |
| 0680156 | 11/1995 | (EP) | | H04B/1/38 |
| 0750405 | 12/1996 | (EP) | | H04B/3/06 |
| 2251768 | 7/1992 | (GB) | | H04Q/7/04 |
| 2306854 | 5/1997 | (GB) | | H04Q/7/30 |
| 9627242 | 9/1996 | (WO) | | H04B/1/38 |

\* cited by examiner

*Primary Examiner*—William Cumming
(74) *Attorney, Agent, or Firm*—Baker Botts L.L.P.

(57) ABSTRACT

The present invention provides a subscriber terminal for communicating over a wireless link with a central terminal of a wireless telecommunications system, the subscriber terminal comprising a first signal processing unit associated with an antenna to transmit and receive signals over the wireless link at first frequencies within an operating frequency band. The first signal processing unit comprises a frequency converter for converting signals between said first frequencies and a second frequency. Further, a second signal processing unit is provided remote from the first signal processing unit and associated with an item of telecommunications equipment to pass signals between said item of telecommunications equipment and the first signal processing unit. The second signal processing unit is formed from signal processing circuitry which is independent of the operating frequency band, the signals being passed between the first signal processing unit and the second signal processing unit at the second frequency via a connection medium connecting the first and second signal processing units. Given this approach, the second signal processing unit can then be formed from signal processing circuitry which is independent of the operating frequency band.

12 Claims, 6 Drawing Sheets

SUBSCRIBER TERMINAL AND METHOD FOR PASSING CONTROL SIGNALS BETWEEN A FIRST AND SECOND SIGNAL PROCESSING UNITS

CROSS REFERENCE TO RELATED APPLICATIONS

The present application claims the benefit of Great Britain Application No. 9724612.8 filed Nov. 20, 1997.

TECHNICAL FIELD OF THE INVENTION

The present invention relates generally to wireless telecommunications systems, and more particularly to subscriber terminals for wireless telecommunications systems.

BACKGROUND OF THE INVENTION

A wireless telecommunications system has been proposed in which a geographical area is divided into cells, each cell having one or more central terminals (CTs) for communicating over wireless links with a number of subscriber terminals (STs) in the cell. These wireless links are established over predetermined frequency channels, a frequency channel typically consisting of one frequency for uplink signals from a subscriber terminal to the central terminal, and another frequency for downlink signals from the central terminal to the subscriber terminal.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

In one embodiment, the central terminal may be connected to a telephone network and exists to relay messages from subscriber terminals in the cell controlled by the central terminal to the telephone network, and vice versa. By this approach, an item of telecommunications equipment connected to a subscriber terminal may make an outgoing call to the telephone network, and may receive incoming calls from the telephone network.

However, such a wireless telecommunications system is not restricted to use with telephone signals, but could instead handle any other appropriate type of telecommunications signal, such as video signals, or data signals such as those used for transmitting data over the Internet, and in order to support new technologies such as broadband and video-on-demand technologies.

FIG. 1 illustrates an example of a typical prior art configuration for a subscriber terminal for such a wireless telecommunications system. FIG. 1 includes a schematic representation of customer premises 22. A customer radio unit (CRU) 24 would typically be mounted on the customer's premises and may include a flat panel antenna or the like 23. The customer radio unit is mounted at a location on the customer's premises, or on a mast, etc, and in an orientation such that the flat panel antenna 23 within the customer radio unit 24 faces in the direction 26 of the central terminal for the service area in which the customer radio unit 24 is located.

The customer radio unit 24 is typically connected via a drop line 28 to a power supply unit (PSU) 30 within the customer's premises. The power supply unit 30 is connected to the local power supply for providing power to the customer radio unit 24 and to a network terminal unit (NTU) 32. The customer radio unit is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 may support more than one line, so that a number of items of subscriber telecommunications equipment could be supported by a single subscriber terminal 20. The subscriber terminal 20 can also be arranged to support analog and digital communications, for example analog communications at 16, 32 or 64 Kbits/sec or digital communications in accordance with the ISDN BRA standard.

The CRU 24 typically includes all of the necessary processing circuitry to convert incoming wireless telecommunications signals into signals recognisable by the items of telecommunications equipment, and also to convert such signals from those items of telecommunications equipment into wireless telecommunications signals for transmission from the antenna 23.

A significant problem with this approach is that the CRU 24 is an expensive item of equipment to replace. Since this is generally located on the outside of the customer's premises, it is prone to theft. In addition, all of the components within the CRU 24 have to be able to withstand the exposure to varying climatic conditions that arise as a result of the CRU 24 being mounted externally. For example, the components must be able to withstand significant variations in temperature, and variations in humidity.

However, one reason why the CRU 24 has previously included all of the necessary processing circuitry to convert incoming wireless telecommunications signals into signals recognizable by the items of telecommunications equipment is that it reduces the technical complexity of the subscriber terminal to have all of the processing circuitry in one housing.

Further, problems with attenuation of the wireless signals transmitted between the central terminal and the subscriber terminal, and vice versa, have previously dictated that the processing circuits of the subscriber terminal should be located physically close to the antenna 23. To illustrate this, it will be appreciated that a signal transmitted from the central terminal at a predetermined power level will be attenuated as it is propagated to the antenna 23 of the subscriber terminal 20.

Once the signal has been received by the antenna 23, there will also be further attenuation within the subscriber terminal as the signal is passed from the antenna to the processing circuits within the subscriber terminal.

Clearly, the further away those processing circuits are from the antenna, then the greater the attenuation is likely to be. A signal strength threshold will be determined below which a signal cannot be processed by the processing circuits within the subscriber terminal 20. Hence, in order to improve the range of the wireless telecommunications system, it has been considered advisable to minimise the distance between the antenna 23 and the processing circuitry of the subscriber terminal provided to process that received signal.

The above requirements have led to the development of subscriber terminals such as those illustrated in FIG. 1, in which an expensive customer radio unit 24 engineered to withstand exposure to varying climatic conditions has been mounted on the exterior of a subscriber's premises.

SUMMARY OF THE INVENTION

Viewed from a first aspect, the present invention provides a subscriber terminal for communicating over a wireless link with a central terminal of a wireless telecommunications system, the subscriber terminal comprising: a first signal processing unit associated with an antenna to transmit and receive signals over the wireless link at first frequencies within an operating frequency band, the first signal processing unit comprising a frequency converter for converting signals between said first frequencies and a second frequency; a second signal processing unit remote from the first signal processing unit and associated with an item of telecommunications equipment to pass signals between said item of telecommunications equipment and the first signal processing unit, the second signal processing unit being formed from signal processing circuitry which is independent of the operating frequency band, the signals being passed between the first signal processing unit and the second signal processing unit at the second frequency via a connection medium connecting the first and second signal processing units.

In accordance with the present invention, the subscriber terminal comprises two distinct signal processing units, the first signal processing unit being associated with an antenna of the subscriber terminal, and the second signal processing unit being associated with an item of telecommunications equipment connected to the subscriber terminal. Signals are transmitted from the antenna, and received by the antenna, via a wireless link at first frequencies within an operating frequency band. In accordance with the present invention, the first signal processing unit comprises a frequency converter for converting signals between said first frequencies and a second frequency. Typically, the second frequency will be less than the first frequency.

The first and second signal processing units are connected via a connection medium, and the telecommunications signals are then passed between the first and second signal processing units via the connection medium at the second frequency.

Given this approach, the second signal processing unit can then be formed from signal processing circuitry which is independent of the operating frequency band. Hence, the same second signal processing unit can be used irrespective of the operating frequency band used for the wireless communications between the subscriber terminal and a central terminal. Further, the above approach significantly reduces the amounts of circuitry required within the first signal processing unit associated with the antenna, thereby reducing the complexity of the first signal processing unit.

The actual location of the first and second signal processing units within the subscriber's premises is a matter of installation choice. However, since the first signal processing unit is associated with the antenna, it is likely to be mounted close to the antenna, and so is likely to be mounted externally. In such an embodiment, the subscriber terminal of the present invention offers significant advantages over the prior art, since the first signal processing unit contains significantly less processing circuitry than the customer radio unit of the prior art subscriber terminal. Indeed, a significant amount of processing which was previously performed within the customer radio unit is in accordance with the present invention performed within the second signal processing unit associated with the item of telecommunications equipment. Assuming the first signal processing unit is manufactured to withstand external use, then the components within the first signal processing unit will have to be able to withstand the exposure to varying climatic conditions in the same way that the components within the customer radio unit of the prior art subscriber terminal had to withstand those climatic conditions. However, since the first signal processing unit has significantly less components, it is cheaper to produce a first signal processing unit with the necessary specifications than it is to produce a customer radio unit of the prior art.

Given that the first signal processing unit is cheaper than the customer radio unit of the prior art, then it is also less prone to theft than the customer radio unit of the prior art subscriber terminal.

As mentioned earlier, the exact location of the first and second signal processing units is a matter of installation choice. However, in preferred embodiments, the first signal processing unit is arranged to be mounted on the exterior of a subscriber's premises, whereas the second signal processing unit is arranged to be located within the subscriber's premises.

Since the first signal processing unit is intended in preferred embodiments to be mounted on the exterior of a subscriber's premises, then it needs to be manufactured to an appropriate specification which will ensure satisfactory operation of the first signal processing unit when mounted externally. Examples of environmental issues which would typically be taken into consideration when designing the first signal processing unit are temperature variation, humidity, corrosion, protection against the ingress of moisture, vibration, etc.

However, in preferred embodiments, the second signal processing unit is arranged to be located within the subscriber's premises, and hence does not need to be manufactured to such a high specification. Whilst the same general environmental issues are again likely to be considered when designing the second signal processing unit, it is clear that the environmental issues are unlikely to place such stringent constraints on a processing unit intended for internal use.

The connection medium connecting the first and second signal processing units may be any suitable connection medium for sending telecommunication signals at the second frequency between the first and second signal processing units. However, in preferred embodiments, the connection medium is a cable over which signals at the second frequency are passed. Preferably, the cable is a coaxial cable. The attenuation of a signal transmitted over a coaxial cable increases with the frequency of the signal. This can be compensated to some extent by appropriate amplification of the signal prior to its transmission over the coaxial cable. At the radio frequencies used for communications over the wireless link between the central terminal and the subscriber terminal, which are of the order of Gigahertz, the coaxial cable has been found to attenuate the signal to an unacceptable level. However, by appropriate choice of a second frequency which is lower than the frequencies used over the wireless link, it has been found that a coaxial cable does provide a suitable medium for transmitting signals between the first and second signal processing units. This is a significant advantage, since coaxial cable is relatively cheap, and hence the use of coaxial cable to pass signals between the first and second signal processing units helps to reduce the overall cost of the subscriber terminal. A further advantage of coaxial cable is that it is also easy to terminate.

In preferred embodiments, the second frequency comprises a downlink second frequency for signals passed from the first signal processing unit to the second signal processing unit and an uplink second frequency for signals passed from the second signal processing circuit to the first signal processing circuit. It will be appreciated by those skilled in the art that many different frequencies may be chosen for the downlink second frequency and the uplink second frequency, dependent on the properties of the connection medium used to pass signals at the second frequency between the first and second signal processing units. However, in preferred embodiments the downlink second frequency is centred on 935 MHz, and the uplink second frequency is centred on 835 MHz. In the preferred embodiments of the present invention, the signals passed between the first and second signal processing units are spread-spectrum signals, and in such cases the downlink second frequency preferably has a frequency range of 915.75 to 954.25 MHz, whilst the uplink second frequency preferably has a frequency range of 815.75 to 854.25 MHz. It has been found that a coaxial cable offers satisfactory performance for the transmission of signals at such frequencies.

The second frequency may be chosen to be the frequency used by the item of telecommunications equipment for transmitting and receiving signals. However, in preferred embodiments, the second frequency is an intermediate frequency, the second signal processing unit comprising a radio modem circuit arranged to process a signal received via the connection medium at the intermediate frequency to generate a baseband signal for passing to the item of telecommunications equipment, and to process a baseband signal from the item of telecommunications equipment to generate a signal at the intermediate frequency for outputting to the first signal processing unit via the connection medium. This approach ensures that the same second frequency can be chosen for all subscriber terminals, irrespective of the actual telecommunications equipment connected to the subscriber terminal.

In preferred embodiments, the second signal processing circuit further comprises a customer interface unit for interfacing between the radio modem circuit and the item of telecommunications equipment. Preferably, the configuration of the customer interface unit is dependent on the item of telecommunications equipment supported by the second signal processing circuit, whereas the configuration of the radio modem circuit is independent of the item of telecommunications equipment supported by the second signal processing circuit. Hence, since the second frequency is in preferred embodiments pre-defined for all subscriber terminals, then the radio modem circuit can have exactly the same configuration, irrespective of the item of telecommunications equipment to be supported by the subscriber terminal, and irrespective of the operating frequency band used for the wireless link between the subscriber terminal and the central terminal.

It will be apparent that the first and second signal processing units can each be provided with separate connections to a power supply. However, in preferred embodiments, the first signal processing unit will generally be mounted at an elevated position on the exterior of a subscriber's premises, and then connected to the second signal processing unit, which is preferably located within the subscriber's premises. Preferably, in such situations, the power required to operate the first signal processing unit is supplied by the second signal processing unit. Further, to reduce the amount of wiring which needs to pass between the first and second signal processing units, then in preferred embodiments the power is supplied to the first signal processing unit via the connection medium, in preferred embodiments the connection medium being a coaxial cable.

Given that in accordance with the present invention, two separate signal processing units are provided, then it will be apparent that it may be necessary for certain control information to be passed between the two units during their operation. Hence, in preferred embodiments, a communications link is provided to allow control signals to be passed between the first and second signal processing units. Preferably, the communications link is established over the connection medium, and the control signals are issued at a predetermined frequency distinct from said second frequency. As an example of the control signals which may be transmitted via the connection medium, the second signal processing unit may send a control signal to the first signal processing unit to turn the transmit circuitry within the first signal processing unit on or off. Further, the first signal processing unit may send a control signal to the second signal processing unit providing information about the transmit power level currently being used.

The first signal processing unit may be provided as a separate component from the antenna, this providing for a greater flexibility over the choice of the antenna.

However, in one embodiment, the first signal processing unit and the antenna are integrated into a single housing. This provides a neat packaging, and would typically include a fairly standard specification antenna suitable for most deployments.

It is intended that the subscriber terminal of the present invention may be connected to one or more items of telecommunications equipment. Hence, the second signal processing unit may be associated with more than one item of telecommunications equipment.

Viewed from a second aspect, the present invention provides a first signal processing unit for a subscriber terminal according to the first aspect of the present invention, the first signal processing unit being associated with an antenna to transmit and receive signals over the wireless link at first frequencies within an operating frequency band, and the first signal processing unit comprising a frequency converter for converting signals between said first frequencies and a second frequency.

Viewed from a third aspect, the present invention provides a second signal processing unit for a subscriber terminal according to the first aspect of the present invention, the second signal processing unit being associated with an item of telecommunications equipment to pass signals between said item of telecommunications equipment and the first signal processing unit, the second signal processing unit being formed from signal processing circuitry which is independent of the operating frequency band.

Viewed from a fourth aspect, the present invention provides a method of communicating over a wireless link with a central terminal of a wireless telecommunications system, comprising the steps of: providing a first signal processing unit associated with an antenna to transmit and receive signals over the wireless link at first frequencies within an operating frequency band; converting, within the first signal processing unit, signals between said first frequencies and a second frequency; providing a second signal processing unit remote from the first signal processing unit and associated with an item of telecommunications equipment to pass signals between said item of telecommunications equipment and the first signal processing unit; forming the second signal processing unit from signal processing circuitry which is independent of the operating frequency band; and passing the signals between the first signal processing unit and the second signal processing unit at the second frequency via a connection medium connecting the first and second signal processing units.

BRIEF DESCRIPTION OF THE DRAWINGS

The present invention will be described further, by way of example only, with reference to a preferred embodiment thereof as illustrated in the accompanying drawings, in which.

DETAILED DESCRIPTION OF THE INVENTION

The present invention may be used in connection with any appropriate type of telecommunications signal, for example a telephone signal, a video signal, or data signals such as those used for transmitting data over the Internet, and in order to support new technologies such as broadband and video-on-demand technologies. However, for the purpose of describing a preferred embodiment of the present invention, a wireless telecommunications system will be considered that is used for handling telephony signals, such as POTS (Plain Old Telephony Service) signals.

Figure 2:
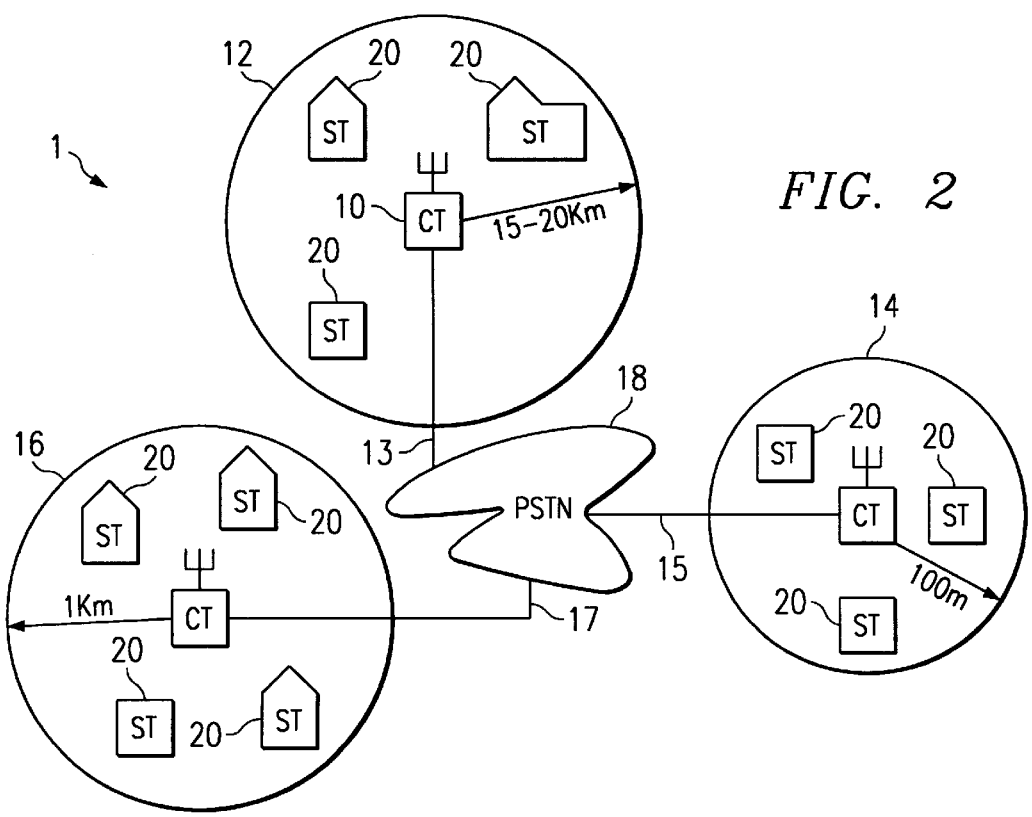
FIG. 2 is a schematic overview of an example of a wireless telecommunications system in which the present invention may be employed.

For the purpose of describing the subscriber terminal of preferred embodiments of the present invention, a wireless telecommunications system will be discussed in which a central station is connected to the public telephone network and exists to relay messages from subscribers in the cell controlled by the central station to the public telephone network, and vice versa. FIG. 2 is a schematic overview of an example of such a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 2. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 2 is based on providing: fixed radio links between subscriber terminals 20 at fixed locations within a service area (e.g., 12, 14, 16) and the central terminal 10 for that service area. In one embodiment, each subscriber terminal 20 is provided with a permanent fixed access link to its central terminal 10. However, in alternative embodiments, demand-based access could be provided, so that the number of subscribers which can be serviced exceeds the number of telecommunications links which can currently be active.

Figure 3:
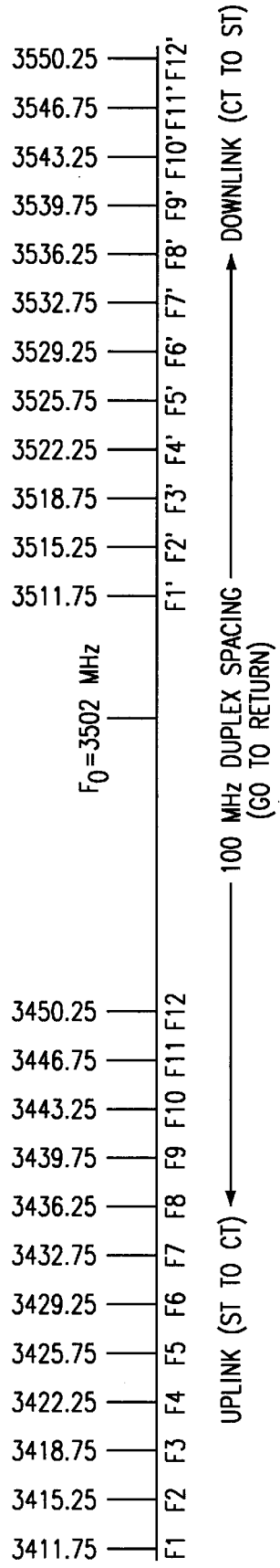
FIG. 3 is an illustration of an example of a frequency plan for the telecommunications system of FIG. 2.

The wireless telecommunications between a central terminal 10 and the subscriber terminals 20 could operate on various frequencies. FIG. 3 illustrates one possible example of the frequencies which could be used. In the present example, the wireless telecommunications system is intended to operate in the 3.4–3.6 GHz Band. In particular the present example is intended to operate in the Band defined by the CEPT SE19 Recommendation. FIG. 3 illustrates the frequencies used for the uplink from the subscriber terminals 20 to the central terminal 10 and for the downlink from the central terminal 10 to the subscriber terminals 20 in preferred embodiments. It will be noted that 12 uplink and 12 downlink radio channels of 3.5 MHz each are provided about a frequency of 3502 MHz. The spacing between the receive and transmit channels is 100 MHz.

Hence, a frequency channel will be defined by one uplink frequency plus the corresponding downlink frequency. Techniques such as 'Code Division Multiplexed Access' (CDMA) may be used to enable a plurality of wireless links to subscriber terminals to be simultaneously supported on each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage communications between them.

Having described a wireless telecommunications system in which a subscriber terminal in accordance with preferred embodiments of the present invention may be employed, the subscriber terminal of preferred embodiments will now be described further with reference to FIG. 4, which is a block diagram illustrating the main components of the subscriber terminal.

In preferred embodiments, the functionality of the subscriber terminal is split between outdoor and indoor units. Hence, an RF block 110 is provided which is typically mounted on the exterior of a subscriber's premises, preferably the RF block 110 being mounted in proximity to a customer antenna unit 100 used to transmit and receive wireless telecommunications signals. The customer antenna unit 100 is then connected to the RF block 110 via an RF antenna cable 105. Although the RF block 110 and customer antenna unit 100 are illustrated in FIG. 4 as separate units connected by an antenna cable 105, it will be appreciated by those skilled in the art that, if desired, the antenna unit can be integrated within the RF block 110 so as to provide a single unit for mounting on the exterior of the subscriber's premises.

In preferred embodiments, all of the electronic circuitry which is dependent on the operating frequency band used for the wireless communications between the subscriber terminal and the central terminal is located within the RF block 110, the purpose of the RF block 110 being to translate received downlink signals from the RF frequency to a standard intermediate frequency suitable for transmissior to the customer modem unit 130, and similarly to translate received signals from the customer modem unit 130 at a standard intermediate frequency into an RF uplink signal for transmission from the customer antenna unit 100.

The RF block 110 and the customer modem unit 130 are connected via a drop cable 120, the drop cable 120 preferably being provided by a coaxial cable. The customer modem unit 130 incorporates a CDMA modem operating at a fixed intermediate frequency, and also includes the electronics required to interface to the one or more items of telecommunications equipment connected to the subscriber terminal. In preferred embodiments, the customer modem unit 130 is located within the subscriber's premises, for example close to the item(s) of telecommunications equipment. Hence, an item of telecommunications equipment 150 is connected to the customer modem unit 130 via a lead 155. Further, the customer modem unit is preferably connected to an AC adaptor 140 via a DC power supply cable 145, the AC adaptor 140 providing power to the customer modem unit 130.

Under the relevant legislation in many countries, it is often required that telecommunications equipment operating via wireless links be provided with a separate source of power so that the telecommunications equipment can be used in an emergency, even in the event of a power cut disabling the main source of power to the equipment. Hence, in preferred embodiments a battery backup unit is incorporated within the customer modem unit, for example a lead acid battery.

The circuitry within the RF block 110 will also require a source of power in order to operate, and in preferred embodiments, the necessary power is provided from the customer modem unit 130 via the drop cable 120.

Figure 4:
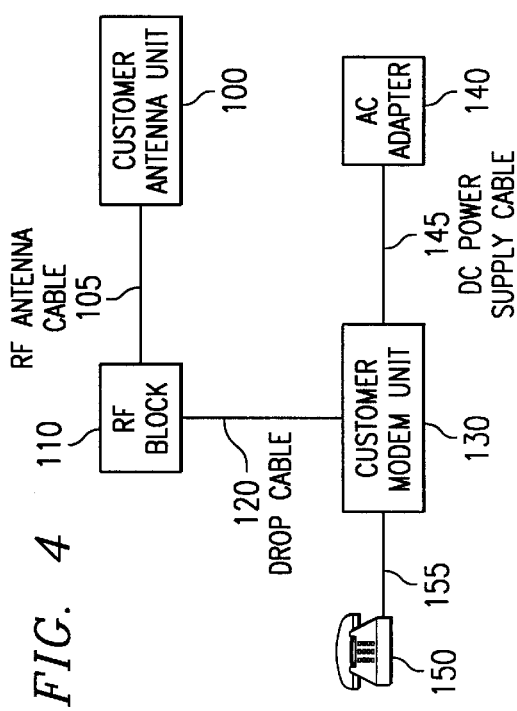
FIG. 4 is a schematic block diagram of a subscriber terminal in accordance with preferred embodiments of the present invention.

The architecture illustrated in FIG. 4 enables a number of cost reductions to be made. For example, if the antenna 100 were to be integrated within the RF block 110, then this would result in a neat packaging, but would require that the antenna be designed for universal deployment. This typically means designing an antenna with as high a gain as possible, contributing to expense. However, by retaining the antenna 100 as a separate unit to the -RF block 110, then the subscriber terminal can be equipped with a lower cost "regular" specification antenna which would be suitable for most deployments. Then, in situations where signal strength is unusually low, the subscriber terminal could optionally be equipped with a high gain antenna, for example as a cost option to the subscriber. This approach increases flexibility, and enables a lower cost antenna to be used for most situations where that antenna will be sufficient.

The subscriber terminal of preferred embodiments will preferably be provided with an antenna which is significantly smaller and lighter than the combined antenna/customer radio unit used in the subscriber terminals of the prior art. By using a smaller and lighter antenna, fewer restrictions on location and mounting hardware are present. For example, since the unit is smaller than that used in prior art subscriber terminals, it is more suitable for pole mounting above the roof line. At higher elevations, the increased receive signal will offset any lower antenna gain resulting from the use of a smaller antenna.

The antenna design and/or technology choice changes with frequency. When designing for a new operating frequency band, changes in the antenna design are likely to result in changes in the subscriber terminal mechanical design and/or packaging, resulting in a large number of manufacturing variants. If the subscriber terminal mechanics cannot be changed, then antenna performance may be compromised. However, the subscriber terminal of preferred embodiments of the present invention allows the option of providing a readily available antenna for a new operating frequency band until volume of sales justifies altering the design of the subscriber terminal. Hence, it will be possible to readily provide a subscriber terminal that will operate in a different RF operating frequency band.

Apart from the above described cost reductions that arise from the RF block/antenna architecture, a number of other cost reductions can be realised as a result of employing the architecture illustrated in FIG. 4. For example, since all of the operating frequency band sensitive components are preferably restricted to the RF block 110, then the modem within the customer modem unit 130 operates at a standard intermediate frequency for all RF operating frequency bands. Hence, the customer modem unit 130 may be manufactured in large volumes regardless of which operating frequency band the equipment will operate in. Subsequent design modifications would then preferably be restricted to the RF block 110.

Figure 1:
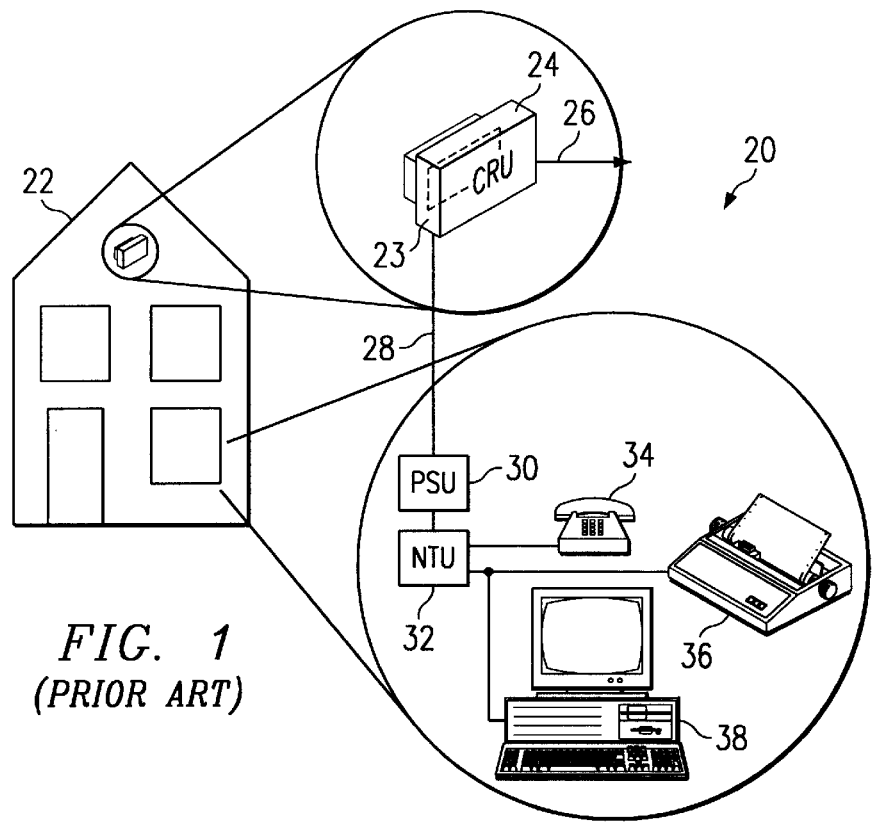
FIG. 1 is a schematic illustration of an example of a typical prior art subscriber terminal.

The drop cables used in the prior art subscriber terminal, such as that illustrated in FIG. 1, typically would comprise a high specification screened five-pair cable. This cable is expensive, as are the connectors required to terminate the cable and protection networks. However, in preferred embodiments of the present invention, a simple coaxial cable is used to carry power, control and IF uplink and downlink signals between the RF block 110 and the customer modem unit 130, thereby removing the need for costly cable and connectors.

In preferred embodiments, the customer interface and radio modem functions are separated within the customer modem unit. A radio modem card is provided which is designed to operate at a standard IF, and to present a fixed interface to a customer interface card. The customer interface card is then dependent on the particular item(s) of telecommunications equipment supported by the subscriber terminal. By this arrangement, the radio modem card will operate with any customer interface variant, and so the radio modem card can be manufactured in high volume with a design that is independent of the telecommunications equipment supported by the subscriber terminal, thereby providing cost savings. Preferably, customer specific variants of the customer interface card may be developed as and when required, and such design changes in the customer interface card will not require re-qualification of the radio modem card. Furthermore, any cost reduction of the radio modem card arising through higher integration of the components will not in preferred embodiments require design changes in the customer interface card.

In preferred embodiments, the AC adaptor 140 used to supply power to the subscriber terminal is a low cost universal AC adaptor supplying 18V DC to the customer modem unit 130 and the RF block 110. The customer modem unit 130 also in preferred embodiments incorporates a low cost 20 W hr lead acid battery for backup in the event of a mains failure. Power dissipation and hence battery cost are reduced in preferred embodiments by arranging logic circuitry to operate from 3.3V where possible, and for all circuitry not required when the RF link is not in use to be powered down, including RF transmit, IF transmit, baseband transmit and codec circuitry. Further, the processors preferably exploit power saving modes of operation.

The low power dissipation results in further cost reductions by easing thermal management requirements. Further, since the outdoor RF block enclosure is smaller and lighter than the prior art customer radio unit, the mounting hardware can be lighter duty, and hence cheaper. Further, the indoor customer modem unit contains a significant proportion of the processing circuitry, and lower cost plastics and assembly methods can be used than were typically required for the customer radio unit of prior art subscriber terminals, since the indoor environment requires less mechanical integrity.

Having discussed some of the benefits arising from employing an architecture as set out in FIG. 4, the RF architecture of the subscriber terminal of preferred embodiments will now be discussed in more detail. As previously discussed with reference to FIG. 4, the RF architecture is split between indoor electronics within the customer modem unit 130 that up/down-converts baseband information to a standard IF band, and outdoor electronics within the RF block 110 that performs the up/downconversion to RF.

Figure 5:
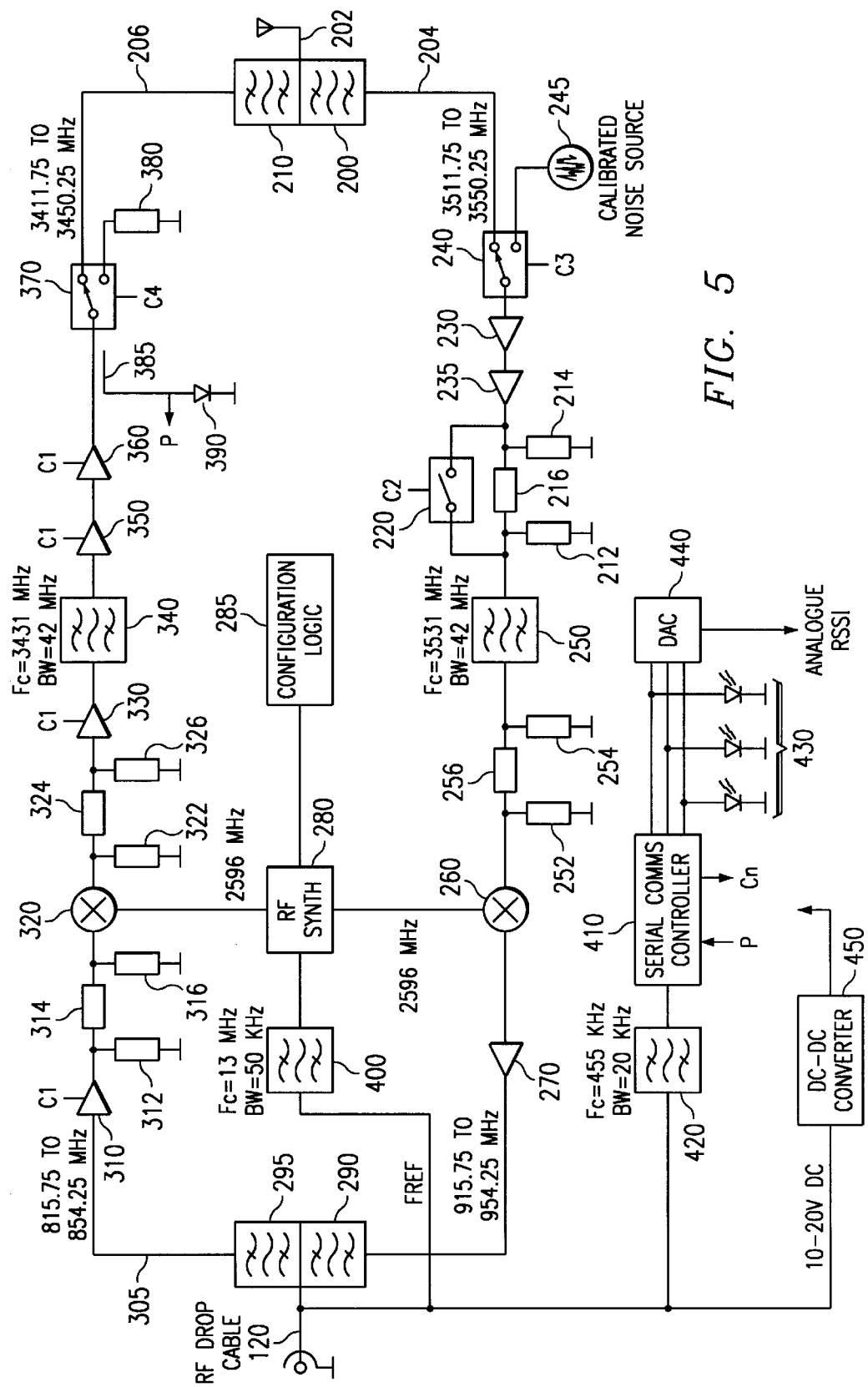
FIG. 5 is a circuit diagram illustrating components within the RF block of the subscriber terminal of preferred embodiments.

FIG. 5 is a diagram illustrating the arrangement of components within the RF block 110 used to convert signals between IF and RF. Considering first an RF signal received by the subscriber terminal, this received signal will be passed via the antenna 202 to an RF filter 200 which is arranged to only let signals with frequencies within a predetermined frequency range to be output over path 204.

The RF filter 200 and RF filter 210 together form a duplex filter, filter 210 being of a type which will allow transmit signals on path 206 to be output to the antenna 202 whilst preventing received RE signals being passed from the antenna 202 to the path 206. Similarly, the RF filter 200 is of a type which prevents transmit signals on path 206 being propagated onto the path 204 whilst allowing received signals via the antenna 202 to be passed to the path 204. In preferred embodiments, the RF filter 200 will allow received downlink signals with centre frequencies ranging from 3511.75 to 3550.25 MHz to be passed through the filter, whilst the RF filter 200 will allow uplink signals with centre frequencies ranging from 3411.75 to 3450.25 MHz to be passed through the filter.

Hence, in preferred embodiments, a received RE signal at the antenna 202 will be passed through the RF filter 200 over path 204 to a switch 240. In normal operation, the switch 240 is arranged to pass the received signal to a low noise amplifier (LNA) 230. However, in a calibration mode of operation, which will be discussed in more detail later, the switch 240 can be used to block out any signals received by the antenna 202, and instead pass a signal from a calibrated noise source 245 to the LNA 230.

Once the signal has passed through the switch 240, it is amplified by the LNA 230 and further amplifier 235 before being passed to an attenuation network of resistors 212, 214, 216. These three resistors 212, 214 and 216 act in combination to attenuate the received signal prior to it being passed on to a filter 250. It is advisable to include such attenuation circuitry 212, 214, 216 so as to ensure that the subsequent circuitry is not exposed to a signal having a higher power level than those components are designed for. Such a high powered signal may, for example, be received at the antenna 202 if the subscriber terminal is placed particularly close to the central terminal with which it is arranged to communicate. The attenuation circuitry 212, 214 and 216 then serves to ensure that this initially received signal is attenuated prior to its propagation through the rest of the processing circuitry. If, subsequently, it is determined that the attenuation performed by the resistors 212, 214 and 216 is unnecessary, then a control signal C2 can be passed to a switch 220 to turn the switch on and thereby bypass the attenuation circuitry.

Once the signal has passed through the attenuation circuitry 212, 214, 216 or switch 220, it is passed to a filter 250. The filter 250 is arranged to remove wide band noise generated by the LNA 230, by only allowing signals within a specified bandwidth centred on a predetermined frequency to pass through the filter. In preferred embodiments, the bandwidth allowed through the filter is 42 MHz, centred on a frequency of 3531 MHz, i.e. the middle of the frequency range for downlink signals passed from the antenna 202 through the RF filter 200.

The signal output by the filter 250 is then passed to a mixer 260 via a matching network of resistors 252, 254, 256. The matching network serves to match the impedance at the output of the filter 250 with the impedance of the input to the mixer 260. The mixer 260 is also arranged to receive an input from an RF synthesizer 280, the RF synthesizer 280 being controlled by configuration logic 285. In preferred embodiments, the signal output by the RF synthesizer 280 to the mixer 260 is at a frequency of 2596 MHz. Based on two input signals at frequencies $f_1$ and $f_2$, a mixer such as mixer 260 will produce signals at two output frequencies, namely $f_1+f_2$ and $f_1-f_2$.

Signals output by the mixer 260 are then amplified by an amplifier 270 before being received by a duplex filter comprising filter 290 and filter 295. In preferred embodiments, the filter 290 is arranged to remove the $f_1+f_2$ component of the signals produced by the mixer 260, and to only allow the $f_1-f_2$ component to be passed through to the drop cable 120. Further, the filter 295 is arranged to prevent any signals from the amplifier 270 being propagated through to the path 305. Hence, in preferred embodiments, the intermediate frequency used to transmit received signals via the drop cable between the RF block 110 and the customer modem unit 130 comprises the $f_1-f_2$ component generated by the mixer 260 from the signals received from both the RF synthesizer 280 and the filter 250.

Considering now signals to be transmitted from the antenna 202, signals at an intermediate frequency in the range of 815.75 to 854.25 MHz are preferably generated by the customer modem unit 130 and transmitted over the drop cable 120, where they are then received by the duplex filter 290, 295. The filter 295 is arranged to propagate such signals over the path 305 to an amplifier 310, whilst the filter 290 prevents such signals from being passed back through the circuitry described earlier. The amplifier 310 amplifies the signals and then passes them to the mixer 320 via a matching network 312, 314, 316. This matching network matches the impedance at the output of the amplifier 310 with the impedance at the input of the mixer 320.

The mixer 320 also receives an input from the REF synthesizer 280, in preferred embodiments this signal being at the same frequency as the signal transmitted from the RF synthesizer 280 to the mixer 260. The $f_1+f_2$ and $f_1-f_2$ components generated by the mixer 320 are then passed via another matching network 322, 324, 326 and an amplifier 330 to a filter 340.

The filter 340 is arranged to only allow signals in a bandwidth of 42 MHz centred on a predetermined frequency to be passed through the filter 340, in preferred embodiments this predetermined frequency being 3431 MHz so as to remove the $f_1-f_2$ component produced by the mixer 320. Subsequent amplification of the signal is performed by amplifiers 350 and 360 to counteract the loss of the filter 340, prior to the signals being output via the switch 370 to the filter 210, and from there to the antenna 202 for transmission. During normal operation, the switch 370 is arranged to pass the signals output by the amplifier 360 to the RF filter 210. However, during installation calibration procedures, the switch 370 can be switched such that the signal is earthed via the resistor 380 to prevent transmission of a test signal generated during calibration.

Further, the signal output by the amplifier 360 to the switch 370 is coupled via a coupler 385 to a diode 390. This provides an indication 'P' of the transmit power of the signal, this indication 'P' being provided to a serial communications controller 410 within the RF block 110, which then passes that information via the drop cable 120 to the customer modem unit 130.

The circuitry illustrated in FIG. 5 is intended for use in a subscriber terminal using the CEPT SE19Recommendation for wireless telecommunications, where the duplex spacing is 100 MHz. However, other duplex spacings, such as 175 MHz and 94 MHz, can easily be accommodated by incorporating an additional fixed frequency synthesizer.

In order for the automatic frequency control (AFC) loop to operate correctly, the RF synthesizer 280 must be phase locked to a 13 MHz frequency reference located in the customer modem unit 130. This is achieved by sending a 13 MHz tone up the drop cable from the customer modem unit, this tone then being isolated using a filter 400. This filter 400 is arranged to allow signals within a bandwidth of 50 KHz and centred on a frequency of 13 MHz to be received by the RF synthesizer 280.

Further, certain control signals can be passed between the customer modem unit 130 and the RF block 110 via the drop cable. To facilitate this, the serial communications controller 410 is provided within the RF block 110, which is arranged to transmit and receive signals centred on a frequency of 455 KHz. A filter 420 is used to isolate signals within a bandwidth of 20 KHz and centred on a frequency of 455 KHz that are passed over the drop cable from the customer modem unit 130 for subsequent processing by the serial communications controller 410. Further, signals emitted by the serial communications controller 410 at a frequency of 455 KHz will be passed through the filter 420 and over the drop cable to the customer modem unit 130. Hence, the serial communications controller 410 allows for bidirectional communications with the CDMA modem in the customer modem unit 130. The communications controller amplitude modulates a 455 KHz carrier with binary data. In preferred embodiments, the data transmitted from the RF block 110 to the CMU 130 comprises transmit power level (P) only. However, preferably the data transmitted from the customer modem unit 130 to the RF block 110 may comprise the following:
1. Transmit on/off control (C1);
2. Transmit calibrate control (C4);
3. Receive calibrate control (C3);
4. Receive gain trim (loud switch) (C2); and
5. Receive signal strength indication (used in installation mode).

The above control signals C1 to C4 are then output by the serial communications controller 410 to the relevant components within the RF block 110, as illustrated in FIG. 5. Further, the receive signal strength indication may be used to drive LEDs 430 provided on the RF block 110 so as to provide a visual indication of the received signal strength, which, as will be discussed in more detail later, is useful during installation. Alternatively, or additionally, the receive signal strength indication may be passed to a DAC 440 to generate an analogue signal at an output port of the RF block 110. A device such as a voltmeter may then be connected to the output port to receive a signal indicative of the received signal strength.

In preferred embodiments, the power required to operate the RF block 110 is received via the customer modem unit 130 over the drop cable 120. A DC—DC converter 450 is provided within the RF block 110 to process the received power signal in order to generate a regulated voltage for supply to the circuitry within the RF block.

Figure 6:
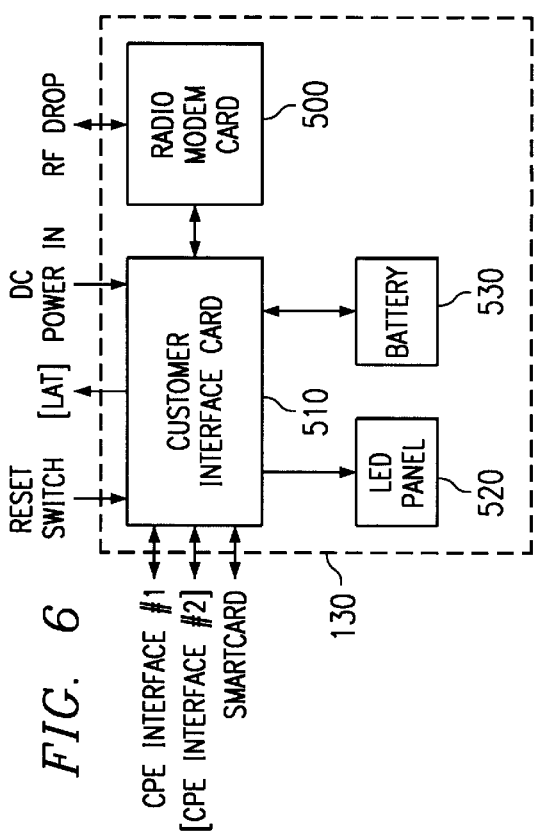
FIG. 6 is a block diagram illustrating the main components of the customer modem unit of the subscriber terminal of preferred embodiments.

The customer modem unit 130 will now be discussed in more detail with reference to FIGS. 6 and 7. As illustrated in FIG. 6, the customer modem unit 130 comprises a radio modem card 500 which is connected to the drop cable 120, the radio modem card 500 communicating with the RF block 110 via the drop cable 120 at an intermediate frequency. The radio modem card 500 incorporates all of the functions required to implement the baseband and IF parts of the CDMA modem. As mentioned earlier, the radio modem card 500 is designed as a generic modem to be manufactured in high volume independent of the customer interface. The interface to the customer interface card 510 is designed to support all anticipated applications, including 1 to 4 line POTS, basic rate ISDN and D128 data.

A more detailed description of the radio modem card will be provided later with reference to FIG. 7B.

The customer interface card 510 is connected to the radio modem card 500, and incorporates the following functions:
1. A CPE interface, one or two line POTS, or ISDN. Preferably, the POTS CPE interface uses a programmable digital signal processor (DSP) to implement voice compression, tone generation and detection. Line hybrid balance and gain trim may also be implemented by a DSP, but alternatively could be implemented with external circuitry;
2. A microcontroller with two full software images held in FLASH of software used to control the customer interface card, downloadable over the air or via a Local Access Terminal (LAT) port. A software image is a specific instance of a piece of software, and providing two software images allows one to be active whilst the other is in standby, thereby allowing the standby image to be updated whilst the active image is running;

3. A Local Access Terminal (LAT) port;
4. A reset switch;
5. An interface to the radio modem card 500;
6. A switching power converter, a battery charger and a backup switch;
7. An LED panel driver; and
8. A smartcard interface.

As illustrated in FIG. 6, the customer modem unit 130 also incorporates a single lead-acid battery 530, this battery having a nominal output voltage of 12 volts for power backup. In preferred embodiments, battery access is via a removable panel on the customer modem unit. Flying or captive leads may be used to connect the battery to the customer interface card 510, which incorporates the battery charging circuitry and switching that is activated in the event of DC input failure.

An LED panel 520 is also provided within the customer modem unit 130 in preferred embodiments, this LED panel being used to provide status information to the user. In preferred embodiments the following indications are provided:

| Position | Type | Function | Off | Flash | On (Red) | On (Green) |
|---|---|---|---|---|---|---|
| 1 | Red | Fault | Unit OK | Unit requires configuration | Fault | — |
| 2 | Green | Power | No power | Switched to battery | — | DC input OK |
| 3 | Bi-colour | Link | No link | — | Link in use | Downlink OK |

It will be appreciated by those skilled in the art that an LCD panel could be used instead of the LED panel.

Having described the main elements of the customer modem unit 130, the circuitry within the radio modem card 500 used to perform IF processing will now be discussed in detail with reference to FIG. 7A.

Considering first an IF signal transmitted to the radio modem card 500 from the RF block 110 via the drop cable 120, this signal will be received by the duplex filter 600, 605. The duplex filter is arranged such that the filter 600 will allow the IF signal to pass to the path 604, whilst the filter 605 will prevent the signal passing to the path 602. Hence, the received signal is passed via the path 604 to a variable attenuator 640, prior to being passed on through an amplifier 630 to a mixer 650. The variable attenuator 640 is controlled by the CDMA modem within the radio modem card (which will be discussed in more detail later with reference to FIG. 7B), and is used to compensate for the losses introduced by the drop cable 120.

The mixer 650 also receives a signal from a first IF synthesizer 665, which is referenced back to a 13 MHz frequency reference oscillator 700. The oscillator 700 is controlled by the CDMA modem within the radio modem card 500 as part of an AFC loop. The first IF synthesizer 665 may be programmed to any one of twelve 3.5 MHz channels within the 42 MHz band spanning the range 815.75 to 854.25 MHz, and hence performs RF channel selection. The $f_1+f_2$ and $f_1-f_2$ components then generated by the mixer 650 are amplified by an amplifier 655 before being passed to a SAW filter 660. The SAW filter is arranged to allow signals in a bandwidth of 3.5 MHz centred on a frequency of 100 MHz to be passed through the filter, and hence the SAW filter 660 removes the $f_1+f_2$ component produced by the mixer 650. The 3.5 MHz SAW filter 660 in effect isolates the RF channel selected by the first IF synthesizer 665.

The output from the SAW filter 660 is then passed via a matching network 672, 674, 676 to a variable amplifier 680, this amplifier 680 performing automatic gain control (AGC). The signal is then passed to the demodulator circuit 690, which performs quadrature demodulation to baseband I and Q components. The I component is then passed via an amplifier 694 to a CDMA demodulator within the radio modem card 500, whilst the Q component is passed via an amplifier 692 to the CDMA demodulator.

Figure 8A:
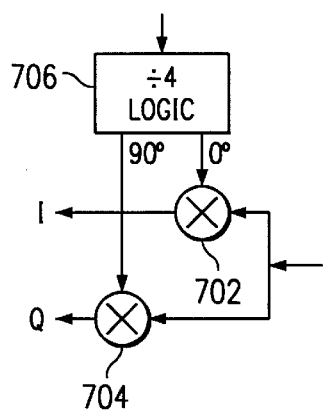
FIGS. 8A and 8B provide more detailed illustrations of portions of the circuitry illustrated in FIG. 7.

A more detailed illustration of the circuitry 690 is provided in FIG. 8A. As can be seen, the signal from the AGC amplifier 680 is divided into two separate signals, one received by the mixer 702 and one received by the mixer 704. A "divide by 4" circuit is arranged to generate four 100 MHz signals, phase shifted by 90° from each other, from a 400 MHz signal generated by a second IF synthesizer 695, this second IF synthesizer also being referenced back to the 13 MHz frequency reference oscillator 700. The mixer 702 receives one of these 100 MHz signals and then uses its two input signals to generate an "I" component. Meanwhile, a second 100 MHz signal phase shifted by 90° is input to the mixer 704, and the mixer 704 then creates the "Q" component from the phase shifted 100 MHz signal and from the other input signal.

Figure 8B:
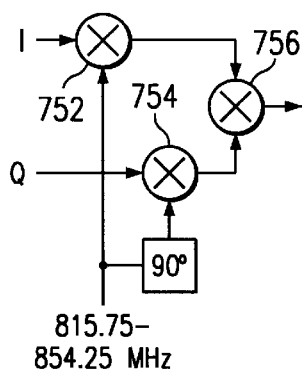

Considering now signals to be transmitted by the subscriber terminal, the I and Q components of the transmit signal are first passed through filters 730 and 735, respectively. These two filters have a bandwidth of 2 MHz in preferred embodiments, and serve to extract the fundamental from the digitally generated signals. The output from the filters 730 and 735 are then amplified by the amplifiers 740 and 745, respectively, before being passed to the circuitry 750. The circuitry 750 is illustrated in more detail in FIG. 8B. As illustrated in FIG. 8B, the I component of the signal is received by a mixer 752, and the Q component of the signal is received by a mixer 754. Both mixers also receive a signal from the first IF synthesizer 665, although the signal received by the mixer 754 is phase shifted by 90° prior to being received by the mixer 754. As mentioned earlier, the first IF synthesizer 665 operates from 815.75 to 854.25 MHz and can be programmed to any one of twelve 3.5 MHz channels within the 42 MHz band in order to perform RF channel selection. The signals generated by the mixers 752 and 754 are then passed to the combiner 756 where they are combined into a single signal.

The combined signal is then passed via a matching network 762, 764, 766 to an amplifier 775. The signal output by the amplifier 775 is then passed through a variable attenuator 780, and a matching network 782, 784, 786. Then the signal is again passed through a variable attenuator 795 before being passed to an amplifier 810.

Then the signal is passed through a variable attenuator 815 prior to being passed over path 602 to the duplex filter 600, 605. The variable attenuator 815 is arranged to compensate for the losses that will be introduced by the drop cable 120. The filter 605 is then arranged to cause the signal on path 602 to be output on to the drop cable 120, whilst the filter 600 prevents that signal from being propagated on to the path 604.

Figure 7A:
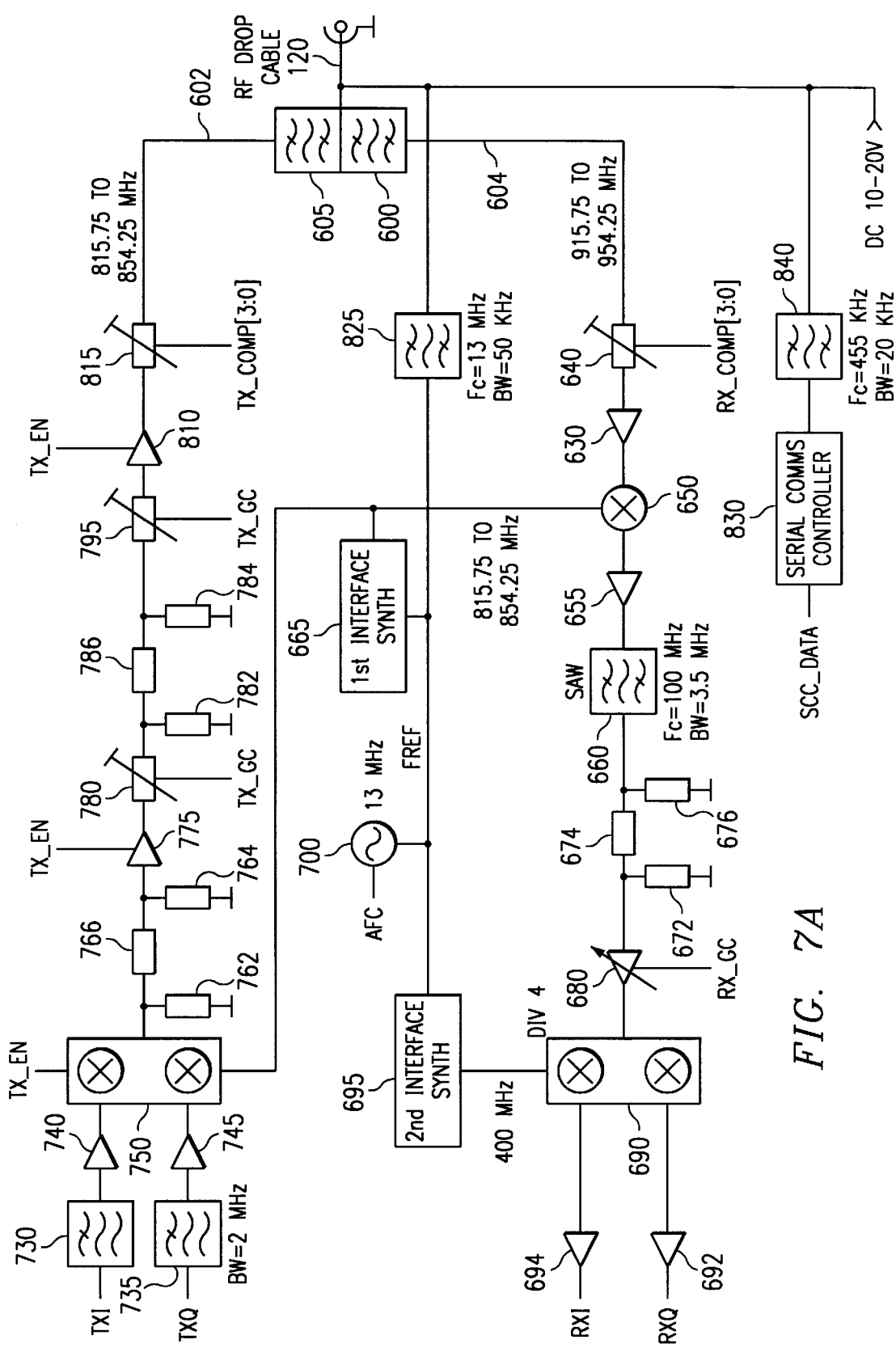
FIG. 7A is a circuit diagram illustrating the components within the radio modem card used to perform IF processing in accordance with preferred embodiments of the present invention.
Figure 7B:
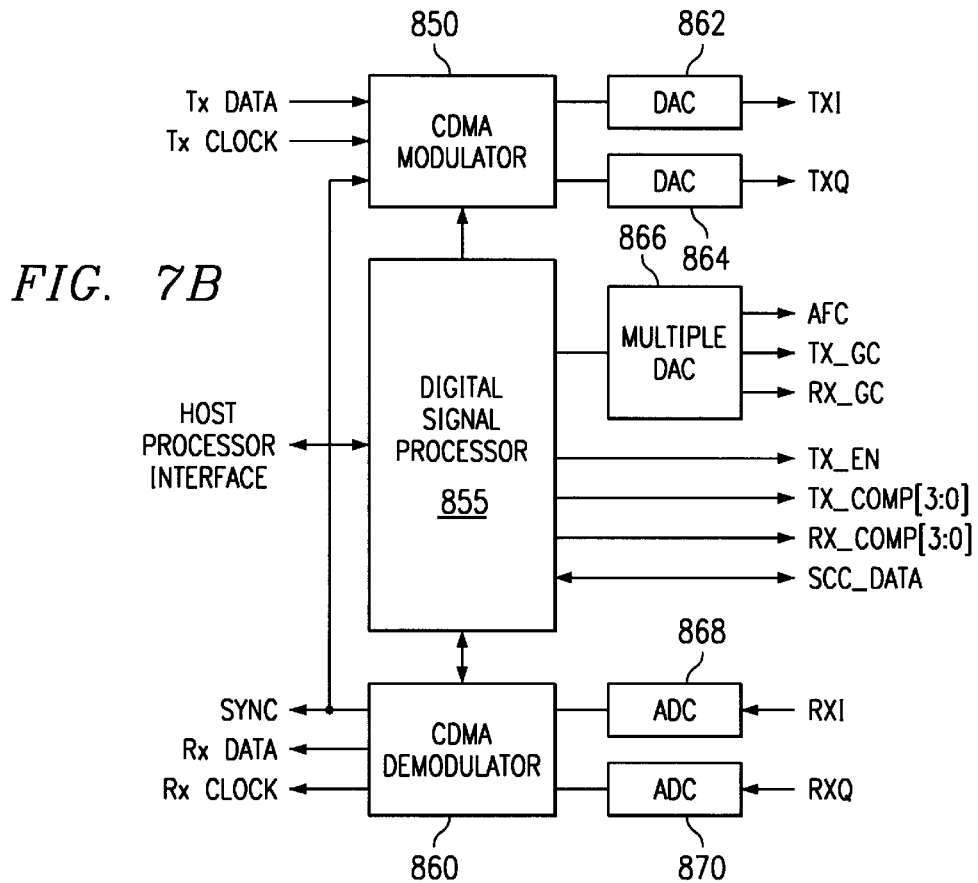
FIG. 7B is a block diagram illustrating the main components of the CDMA modem within the radio modem card which is used to control the circuitry of FIG. 7A.

As also illustrated in FIG. 7A, the 13 MHz reference frequency generated by the oscillator 700 is passed through a filter 825 having a bandwidth of 50 KHz centred on a frequency of 13 MHz. The output of the filter 825 is then passed to the drop cable 120 for transmission over the cable to the RF block 110. As mentioned earlier, in order for the AFC loop within the RF block 110 to operate correctly, the RF synthesizer 280 within the RF block 110 must be phase locked to the 13 MHz frequency reference generated by the oscillator 700 in the customer modem unit 130. By sending this 13 MHz tone up the drop cable, the required phase locking of the RF synthesizer can be achieved.

Further, as illustrated in FIG. 7A, a serial communications controller 830 is provided to allow low rate bidirectional communications with the RF block 110, the communications controller amplitude modulating a 455 KHz carrier with binary data. This signal is then passed via a filter 840 having a bandwidth of 20 KHz centred on a frequency of 455 KHz, and from there the signal is passed to the drop cable 120. The filter 840 also serves to isolate any control signals issued by the RF block 110 and passed over the drop cable 120 to the radio modem card 500. As mentioned earlier, in preferred embodiments the RF block 110 may for example issue a control signal identifying the transmit power level. The filter 840 then isolates that signal, and passes it on to the serial communications controller 830.

Also, the radio modem card 500 is arranged to provide DC power to the drop cable 120 for transmission to the RF block 110 to power the RF block components.

The CDMA modem within the radio modem card 500 which is used to control the circuitry of FIG. 7A will now be described in more detail with reference to FIG. 7B. The CDMA modem of preferred embodiments essentially consists of a Digital Signal Processor (DSP) 855 which is connected to both a CDMA modulator 850 and a CDMA demodulator 860. The RXI and RXQ signals generated by the demodulator circuit 690 are passed through ADCs 868 and 870, respectively, prior to being received by the CDMA demodulator 860.

The CDMA demodulator 860 then performs CDMA demodulation under the control of the DSP 855, and outputs the received data (Rx data) and received clock (Rx clock) signals to the customer interface card 510. Further, the CDMA demodulator 860 generates a synchronisation (Sync) signal used to synchronise various circuitry within the customer modem unit 130. This Sync signal is output to the customer interface card 510 and is also provided to the CDMA modulator 850.

The CDMA demodulator receives data (Tx data) and clock (Tx clock) signals from the ST's connected telecommunications equipment via the customer interface card 510. This data is then used by the CDMA modulator 850 to generate CDMA modulated I and Q signals under the control of the DSP 855, these signals being passed through respective DACs 862 and 864 to generate the TXI and TXQ signals input to the circuitry of FIG. 7A.

The DSP 855 has a host processor interface with the customer interface card 510 to enable communications with the microcontroller on the customer interface card to take place. Further the DSP 855 can receive signals from the CDMA demodulator 860, such as details of signal strength used by the DSP during installation of the ST, this being described in more detail later.

The DSP 855 is arranged to generate the various signals used to control the circuitry of FIG. 7A. Hence, the DSP outputs signals to a multiple DAC 866, which then outputs the AFC signal input to the oscillator 700 to perform automatic frequency control, and outputs the TX_GC and RX_GC gain control signals input to the variable attenuators 780, 795 and the variable amplifier 680 to control gain of the transmit and receive signals during normal operation.

Further, the DSP 855 generates the transmit enable (TX_EN) signal used to control the circuitry 750, and amplifiers 775, 810 to allow transmission to take place. In addition, during calibration of the circuitry (eg. on installation), the DSP 855 generates the TX_COMP and RX_COMP signals used to control the variable attenuators 815 and 640, respectively, to compensate for the losses incurred by transmission of the uplink and downlink IF signals over the drop cable 120. This process will be described in more detail later.

Finally, the DSP 855 is responsible for generating the various control signals (SCC_DATA) passed to the serial communications controller 830 for transmission over the drop cable 120 to the RF block 110. Additionally, the DSP 855 will receive via the serial communications controller 830 any control signals issued by the RF block 110, for example the transmit power level indication 'P'.

Figure 9:
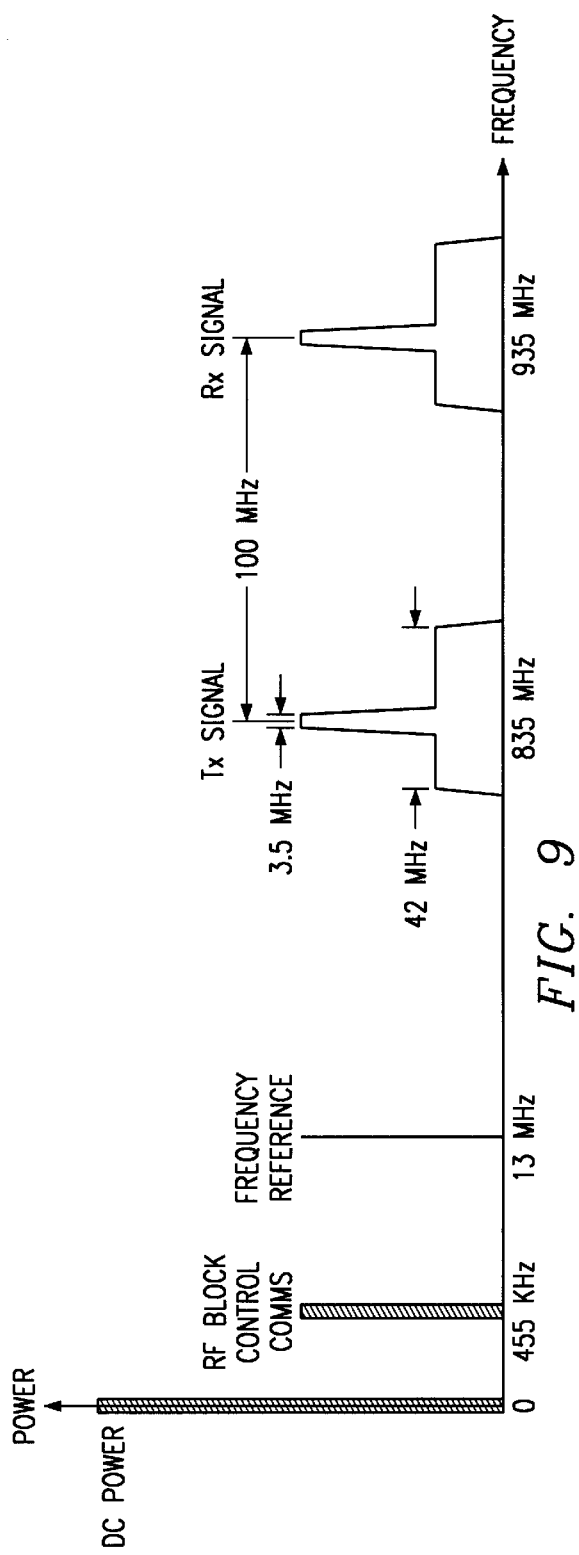
FIG. 9 is a diagram illustrating the spectrum utilisation of the drop cable used in subscriber terminals of preferred embodiments of the present invention.

Having described the circuitry of the RF block 110 and the radio modem card 500, the signals passed between these two units via the drop cable 120 will now be discussed in more detail with reference to FIG. 9, which illustrates the spectrum utilisation for the drop cable. As mentioned earlier, the drop cable 120 preferably comprises a two conductor coaxial cable carrying the following signals between the radio modem card 500 and the RF block 110:
1. Uplink IF spread-spectrum signal;
2. Downlink IF spread-spectrum signal;
3. 13 MHz frequency reference;
4. 455 KHz carrier data link; and
5. DC power, preferably 10 to 20 volts.

As mentioned earlier, elements of the RF block 110 are in preferred embodiments controlled by the CDMA modem on the radio modem card 500. Digital data is pulse position modulated on to a 455 KHz carrier, this frequency being chosen due to ready availability of ceramic filters and resonators and because it is not harmonically related to the 13 MHz frequency reference signal (13/0.455=28.5714). In preferred embodiments, each data bit is sent using a line code comprising a start bit, data bit and stop bit. The correlation between the data bit and the line code in preferred embodiments is as follows:

| Data bit | Line code |
| --- | --- |
| 0 | 100 |
| 1 | 110 |

Preferably data is sent in packets as follows:

| Packet Element | Number of Bits |
| --- | --- |
| Sync Header | 3 |
| Address | 1 |
| Payload | 8 |
| Parity | 1 |

In preferred embodiments, the packets are time division multiplexed every 30 ms. The CMU controller preferably acts as a protocol master, initiating communications every 30 ms. The header preferably comprises a fixed sequence, say 001. Further, the address is typically set to zero for communication with the RF block 110, and a non-zero address is used for communications with equipment other than the RF block, for example a receive signal strength meter. The payload preferably comprises 8 bits and the packet is error protected with a single parity bit.

Figure 10:
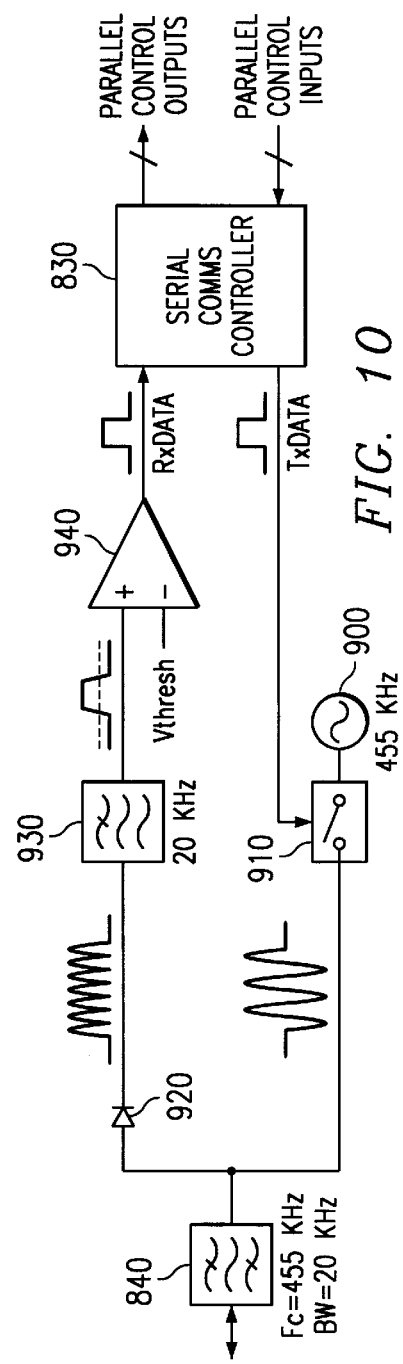
FIG. 10 provides a more detailed illustration of the serial communications controller illustrated in FIG. 7.

FIG. 10 provides a more detailed illustration of the serial communications controller 830 and the filter 840 illustrated in FIG. 7. An oscillator 900 is arranged to produce a carrier signal at 455 KHz. Control inputs passed to the serial communications controller 830 then cause control data to be output from the serial communications controller to a switch 910, the switch 910 pulse position modulating that data on to the 455 KHz carrier signal. This signal is then passed to the filter 840 which allows a bandwidth of 20 KHz centred on 455 KHz to be output to the drop cable 120.

For a control signal issued by the RF block 110, the filter 840 will isolate that signal and then pass it to the diode 920 which will rectify the signal. The rectified signal is then passed to a low pass filter 930 which removes the 455 KHz carrier signal. The output from the filter 930 is then passed to a comparator 940 where the signal is compared with a threshold voltage to produce at the output a digital signal for passing to the serial communications controller 830. The serial communications controller then uses this signal to create parallel control outputs.

The architecture illustrated in FIG. 10 is also applicable to the serial communications controller 410 and the filter 420 of the RF block 110 illustrated in FIG. 5.

The serial communications controller within the RF block 110 may also handle configuration of the RF synthesizer 280 at power-up.

Having described the subscriber terminal of preferred embodiments in detail, the installation of the subscriber terminal will now be discussed. Important aspects of the installation process are unit configuration and antenna alignment.

Before an ST becomes operational, configuration data must be entered into the unit. As an example the following minimum information may be required:
1. RF channel number;
2. PN code; and
3. An ST identifier (preferably a six digit number).

Two options exist for entering this data. Firstly, if a LAT port is fitted, as is the case for the customer modem unit 130 of preferred embodiments illustrated in FIG. 6, then an external terminal may be used to configure the unit. This technique would generally be used for STs with ISDN or D128 interfaces. An alternative approach is to use a telephone connected to the subscriber terminal, such an approach typically being used if the subscriber terminal is to be used for POTS signalling. A technique that may be used for this purpose is described in detail in the patent application GB-A-2,301,738.

Once the necessary configuration data has been entered, then in preferred embodiments a calibration step is performed to calibrate the ST with respect to the signal losses introduced by the drop cable. The technique used in preferred embodiments to perform this calibration will now be described with reference to FIGS. 5, 7A and 7B.

Firstly, to calibrate the downlink path to compensate for losses introduced by the drop cable, the DSP 855 generates the receive calibrate control signal C3 on the SCC_DATA channel, which is then passed by the serial communications controller 830 over the drop cable 120 to the serial communications controller 410 in the RF block 110. This causes the serial communications controller 410 to issue the C3 signal to the switch 240, to cause the calibrated noise source 245 provided in the RF block 110 to be switched into the downlink path. Preferably, this calibrated noise source produces additive white Gaussian noise at a predetermined power level. This noise signal is then passed through the receive path circuitry of FIG. 5, over the drop cable 120, and through the receive path circuitry of FIG. 7A to produce RXI and RXQ components which are output to the CDMA demodulator 860 of the CDMA modem illustrated in FIG. 7B.

Here, predetermined criteria are stored which the calibrated noise source should exhibit when received by the CDMA demodulator 860 if the losses of the drop cable have been compensated for. By comparing the actual received noise signal with the predetermined criteria, the CDMA demodulator can determine whether the setting of the variable attenuator 640 should be incremented or decremented. One example of the predetermined criteria which may be stored is the frequency with which signals outside a certain number of standard deviations from the peak of the Gaussian signal should be received. Since the noise signal is digitised prior to being received by the CDMA demodulator 860, the CDMA demodulator can be arranged to keep a count of the number of times the signal is outside the determined number of standard deviations, and notify the DSP 855 if the number exceeds a certain threshold, thereby indicating that the setting of variable attenuator 640 should be altered.

When the DSP 855 receives a signal from the CDMA demodulator 860 identifying that the setting of the variable attenuator 640 should be altered, it generates a RX_COMP signal for outputting to the variable attenuator 640 to alter its setting. By appropriate setting of the variable attenuator 640, the losses introduced by the drop cable in the receive path can be compensated for.

To calibrate the uplink path to compensate for losses introduced by the drop cable, the DSP 855 is arranged to instruct the CDMA modulator 850 to generate, in preferred embodiments, a calibrated noise signal for transmission through the transmit path circuitry of FIG. 7A and FIG. 5. To avoid the noise signal being transmitted from the antenna 202, the DSP 855 also generates a control signal C4 on the SCC_DATA output, which is passed via the serial communications controller 830 of the radio modem card 500 over the drop cable 120 to the serial communications controller 410 in the REF block, thereby causing the serial communications controller 410 to issue the C4 signal to the switch 370 to earth the transmit signal.

However, the coupler 385 in the RF block 110 still receives the transmitted noise signal, and hence provides an indication 'P' of the transmit power of the signal. This indication 'P' is provided to the serial communications controller 410 within the RF block 110, which then passes that information via the drop cable 120 to the serial communications controller 830 in the radio modem card 500. This data is then passed to the DSP 855 via the SCC DATA channel, and the DSP compares the indication P with a predetermined value to determine whether the setting of the variable attenuator 815 should be altered. If alteration is necessary, then the DSP outputs a suitable TX COMP signal to the variable attenuator 815 to alter its setting. By this approach, the losses introduced by the drop cable in the transmit path can be compensated for.

Once the necessary calibration steps have been performed, then the antenna 100 of the subscriber terminal is in preferred embodiments aligned so that it is pointing towards the central terminal with which it is intended to communicate. Since the antenna is typically mounted at an elevated position on the exterior of the subscriber's premises, then the engineer will generally have to climb up to the mounting location of the antenna and manually align the antenna unit.

Where a LAT port is fitted to the subscriber terminal, an external terminal may be used to monitor receive signal strength and act as a guide for antenna panning. However, since the LAT port, if any, will typically be provided at the customer modem unit 130 located inside the subscriber's premises, then such an approach is very cumbersome if carried out by a single engineer, and so typically involves two engineers, one for adjusting the antenna, and one for monitoring the receive signal strength.

In accordance with preferred embodiments of the present invention, a number of simplified options are available for aiding antenna alignment. All of these options require that the subscriber terminal be placed in a special mode of operation which inhibits normal operation. This could for example be achieved by entering a special code into the subscriber terminal following unit reset. The unit would then remain in antenna alignment mode to enable the installation to be completed.

The receive signal strength is measured on de-spread data in the CDMA demodulator 860 within the customer modem unit 130, where the true signal power can be distinguished from access noise. One option for removing the requirement for an external terminal to be fitted via the LAT port is to use the customer modem unit LED/LCD panel to indicate receive signal strength. However, this would still typically require two engineers to perform the installation.

Hence, an alternative option is to incorporate LEDs into the RF block 110 to indicate receive signal strength, as was discussed earlier with reference to FIG. 5. Since the RF block 110 is likely to be located very close to the antenna unit 100, and indeed in some implementations both the RF block 110 and the antenna unit 100 will be incorporated into the same physical device, then the engineer that is adjusting the antenna can also view the LED indication on the RF block. However, as mentioned earlier, the receive signal strength is preferably measured in the CDMA demodulator within the customer modem unit 130.

Hence, in preferred embodiments, the receive signal strength as determined by the CDMA demodulator is then output by the DSP 855 on the SCC_DATA output and transmitted back up the drop cable 120 via the serial communications link, and subsequently displayed on the LEDs of the RF block 110.

As illustrated in FIG. 5, as an alternative, or in addition, to the LEDs, a DAC 440 can be provided in the RF block 100 to generate at an output port of the RF block an analogue received signal strength indication (RSSI). Then, a device such as a voltmeter can be attached by the installation engineer to provide an indication of received signal strength.

Further, since in preferred embodiments the ST has already been calibrated, prior to the antenna alignment process being performed, to compensate for losses introduced by the drop cable, the LEDs or voltmeter can be calibrated to provide a direct reading of received signal strength to the installation engineer.

Figure 11:
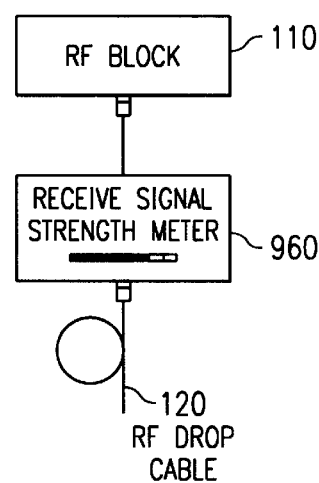
FIG. 11 illustrates the use of a receive signal strength meter that may be used in embodiments of the present invention to assist in antenna alignment during installation of the subscriber terminal.

Yet another alternative approach, depicted in FIG. 11, is to place a receive signal strength meter 960 in line with the drop cable 120. As before, the receive signal level is transmitted up the RF block cable using the serial communications link, but in this instance is intercepted by the meter. The signal strength level is then displayed on an LED or LCD panel provided by the signal strength meter. When alignment is complete, the meter is removed and the drop cable fitted to the RF block 110.

The main advantage of providing either indication mechanisms in the RF block or a separate meter connected to the cable in the vicinity of the RF block is that the signal strength can be evaluated near the RF block, thereby enabling the ST to be installed by a single person. Further, in preferred embodiments, the indication can be calibrated to give a direct indication of "fade margin", i.e. the amount of dB variation before the communication path is lost.

It will be appreciated by those skilled in the art that the actual device used to provide the indication of received signal strength is not important. Any type of visual or audible indication could be used as appropriate.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A subscriber terminal for communicating over a wireless link with a central terminal of a wireless telecommunications system, the subscriber terminal comprising:

a first signal processing unit associated with an antenna to transmit and receive signals over the wireless link at first frequencies within an operating frequency band, the first signal processing unit comprising a frequency converter for converting signals between said first frequencies and a second frequency;

a second signal processing unit remote from the first signal processing unit and associated with an item of telecommunications equipment to pass signals between said item of telecommunications equipment and the first signal processing unit, the second signal processing unit being formed from signal processing circuitry which is independent of the operating frequency band, the signals being passed between the first signal processing unit and the second signal processing unit at the second frequency via a connection medium connecting the first and second signal processing units; and a communication link to allow control signals to be passed between the first and second signal processing units, said communications link being established over the connection medium, and the control signals being issued at a predetermined frequency distinct from said second frequency, wherein the second frequency comprises a downlink second frequency for signals passed from the first signal processing unit to the second signal processing unit and an uplink second frequency for signals passed from the second signal processing unit to the first signal processing unit.

2. A subscriber terminal as claimed in claim 1, wherein the first signal processing unit is arranged to be mounted on the exterior of a subscriber's premises, whereas the second signal processing unit is arranged to be located within the subscriber's premises.

3. A subscriber terminal as claimed in claim 1, wherein the connection medium is a cable over which signals at said second frequency are passed.

4. A subscriber terminal as claimed in claim 3, wherein said cable is a coaxial cable.

5. A subscriber terminal for communicating over a wireless link with a central terminal of a wireless telecommunications system, the subscriber terminal comprising:

a first signal processing unit associated with an antenna to transmit and receive signals over the wireless link at first frequencies within an operating frequency band, the first signal processing unit comprising a frequency converter for converting signals between said first frequencies and a second frequency;

a second signal processing unit remote from the first signal processing unit and associated with an item of telecommunications equipment to pass signals between said item of telecommunications equipment and the first signal processing unit, the second signal processing unit being formed from signal processing circuitry which is independent of the operating frequency band, the signals being passed between the first signal processing unit and the second signal processing unit at the second frequency via a connection medium connecting the first and second signal processing units; and a communication link to allow control signals to be passed between the first and second signal processing units, said communications link being established over the connection medium, and the control signals being issued at a predetermined frequency distinct from said second frequency, wherein the second frequency is an intermediate frequency, the second signal processing unit comprising a radio modem circuit arranged to process a signal received via the connection medium at the intermediate frequency to generate a baseband signal for passing to the item of telecommunications equipment, and to process a baseband signal from the item of telecommunications equipment to generate a signal at the intermediate frequency for outputting to the first signal processing unit via the connection medium.

6. A subscriber terminal as claimed in claim 5, wherein the second signal processing circuit further comprises a customer interface unit for interfacing between the radio modem circuit and the item of telecommunications equipment.

7. A subscriber terminal as claimed in claim 6, wherein the configuration of the customer interface unit is dependent on the item of telecommunications equipment supported by the second signal processing circuit, whereas the configuration of the radio modem circuit is independent of the item of telecommunications equipment supported by the second signal processing circuit.

8. A subscriber terminal as claimed in claim 1, wherein the power required to operate the first signal processing unit is supplied by the second signal processing unit.

9. A subscriber terminal as claimed in claim 8, wherein the power is supplied to the first signal processing unit via the connection medium.

10. A subscriber terminal as claimed in claim 1, wherein the first signal processing unit and the antenna are integrated in to a single housing.

11. A subscriber terminal as claimed in claim 1, wherein the second signal processing unit is associated with more than one item of telecommunications equipment.

12. A method of communicating over a wireless link with a central terminal of a wireless telecommunications system, comprising the steps of:

providing a first signal processing unit associated with an antenna to transmit and receive signals over the wireless link at first frequencies within an operating frequency band;

converting, within the first signal processing unit, signals between said first frequencies and a second frequency;

providing a second signal processing unit remote from the first signal processing unit and associated with an item of telecommunications equipment to pass signals between said item of telecommunications equipment and the first signal processing unit;

forming the second signal processing unit from signal processing circuitry which is independent of the operating frequency band;

passing the signals between the first signal processing unit and the second signal processing unit at the second frequency via a connection medium connecting the first and second signal processing units; and passing control signals between the first and second signal processing units over the connection medium at a predetermined frequency distinct from the second frequency, wherein the second frequency comprises a downlink second frequency for signals passed from the first signal processing unit to the second signal processing unit and an uplink second frequency for signals passed from the second signal processing unit to the first signal processing unit.

* * * * *